United States Patent Office 3,425,915
Patented Feb. 4, 1969

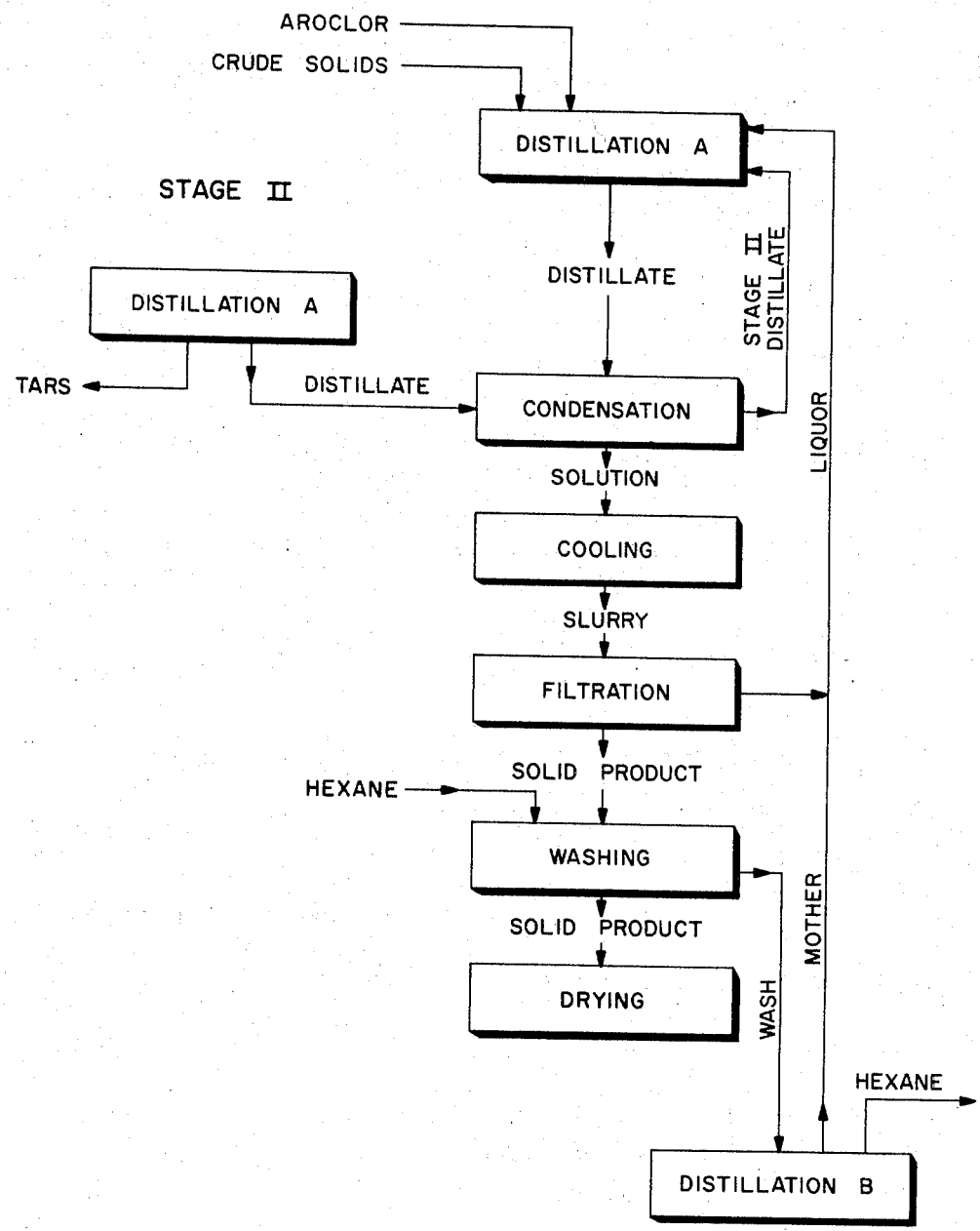

3,425,915
PURIFICATION OF HIGH BOILING AROMATIC COMPOUNDS BY CODISTILLATION WITH A CHLORINATED DIPHENYL SOLVENT
Edward S. Roberts, 874 Woodward Ave., Ridgewood, N.Y. 11227, and Ludwig J. Christmann, 9 Center Knolls, Bronxville, N.Y. 10708
Continuation of application Ser. No. 256,523, Feb. 6, 1963. This application Feb. 9, 1967, Ser. No. 615,031
U.S. Cl. 203—47  15 Claims
Int. Cl. B01d 3/40

ABSTRACT OF THE DISCLOSURE

High melting organic compounds can be purified by codistilling the high melting compound with a solvent in which the compound is highly soluble at high temperatures and relatively insoluble in the cold. This can be illustrated by the purification of crude terephthalic acid. Crude terephthalic acid and chlorinated diphenyl solvent were charged to a distillation apparatus and distilled in the range of 320–345° C. The purified product had a neutralization equivalent of 83 which is the theoretical for terephthalic acid.

---

This application is a continuation of application Ser. No. 256,523, filed Feb. 6, 1963 and now abandoned by the present inventors.

The present invention relates to improved methods of recovering relatively high melting and high boiling organic compounds from crude mixtures of these compounds incorporating high boiling tars and resinous materials, more specifically with improvements in such methods using distillation.

In the past attempts to solve this purification problem have been directed essentially in three different directions namely: selective crystallization, adsorption of impurities from solutions mainly using activated carbon, and distillation.

Heretofore the use of distillation has been fraught with many difficulties when the product to be recovered has both high melting and high boiling points. The difficulties become particularly apparent when the melting point exceeds 120° C. and boiling point exceeds 200° C. It is for the purification of substances in this range that our invention is useful.

One of the problems encountered in industry is exemplified by the recovery and purification of phthalic anhydride. Phthalic anhydride is usually produced by the partial oxidation of naphthalene or ortho xylene in vapor phase using excess air and a catalyst at high temperature. The vapors leaving the converter are cooled and the phthalic anhydride is recovered from the gas stream by solidification of a sublimate on cooled surfaces which are later heated to melt off the phthalic anhydride. The crude product thus recovered is then again distilled and recovered in a condenser operated at such pressures that the temperaturme is above the melting point. The molten product is then usually recovered as flake. The problem is that at atmospheric pressure at which the oxidation unit is run, the partial pressure of phthalic anhydride is below the pressure at the triple point at which phthalic anhydride exists as a liquid, solid and vapor in equilibrium. Therefore, the cooling surfaces upon which the phthalic anhydride is recovered are covered with solid and the heat transfer is progressively impaired. This requires large surfaces and duplicate facilities in which alternately to condense and then to remelt. In addition, there is the further problem of the separation of the pure phthalic anhydride from undesired tars present in the crude mixture.

In the purification of high melting products by distillation, the problems of fouling of condenser cooler surfaces arises and requires that the condenser be run at temperatures above the melting point. In all cases in which no medium is added, the reboiler must be run at temperatures above the melting point. In some cases this is very high, for example naphthalic anhydride (M.P. 274° C.), 2,3-dicarboxy naphthalene anhydride (254° C.). This introduces the problem of decomposition of high boilers and fouling of heating surfaces with tars.

In the past, when the purification of such high melting substances was undertaken by distillation this was done by cosublimation. This process resembles steam distillation in that a mixture of the solid to be distilled and a liquid medium in which the solid is relatively insoluble is introduced into the reboiler. In these cases the presence of the solid has little or no effect on the boiling point of the liquid and vice versa, each substance exerts the vapor pressure of pure substance at the temperatures used.

A variation of this cosublimation is the case of combined distillation of immiscible liquids. For the distillation of high melting point solids, the liquids frequently used are high boiling mineral oils. In the reboiler these oils provide a medium for heat transfer and their vapors carry along the vapor of the materal being distilled. In all such cases trouble is encountered with the fouling of cooling surfaces when the vapor mixture is cooled. In many such cases trouble is also encountered with fouling of the heating surfaces in the reboiler.

The present invention broadly consists of the use of a solvent to carry out the distillation process. The product should be highly soluble in the solvent at high temperatures and relatively insoluble in the cold.

One application of the present invention is to oxidize a compound such as ortho xylene in solution in trichlorobenzene to phthalic anhydride. The oxidized mixture is distilled and, surprisingly enough, it was found that both the solvent and anhydride distilled over even though the solvent boils at 216° C. and the anhydride at 284.5° C. It was also found that the vapors could be condensed warm without coating the cooling surface and that the pure phthalic could be obtained by further cooling of the condensate which caused crystallization. Separation was by filtration followed by washing the residue with heptane. The mother liquor is returned to the oxidation mixture in amounts sufficient to keep the temperature at about 245° C. The tars concentrate in the distilling chamber are eventually discarded.

The most suitable solvents for use in this process have been found to be the Aroclors which are chlorinated diphenyls and have boiling points (depending on the degree of chlorination) ranging from 275° to 375° C. for liquids having usable viscosities. These higher boiling point materials permit the use of reduced pressures and therefore lower temperatures of distillation. Some of the Aroclors found most satisfactory are:

| | Distillation range, ° C. |
|---|---|
| 1221 | 275–320 |
| 1232 | 290–325 |
| 1242 | 325–360 |
| 1248 | 340–375 |

This invention can also be applied to recovery and purification of vapor phase oxidation products such as phthalic anhydride and naphthalic anhydride. In such a system, the oxidation vapors are cooled to a temperature somewhat above that at which condensation takes place and are then scrubbed with the appropriate Aroclor and the Aroclor-product solution is distilled and the distillate then condensed in a cooler at a temperature above the saturation point of product in the solvent. The solution is then cooled further in a crystallizer and the solid product recovered. The mother liquor is recycled. In this application the Aroclors used have such flash and fire point characteristics as would make their use safe at scrubber temperatures in the presence of excess oxygen. The mother liquor should be introduced into the scrubber at a temperature above the dew point of the water vapor passing through the scrubber and in sufficient quantity to keep the condensed product in solution and to remove the product vapor from the gas stream effectively.

In the cases in which the solvent product ratio is high, the solution leaving the scrubber may be cooled and the clear solvent decanted so as to leave a relatively concentrated slurry which is then distilled. The product solvent vapors are condensed warm above the saturation point of the product in the solvent. The solution is then further cooled in a crystallizer to recover the purified product. The mother liquor is returned to the scrubber with part going to the still to control its temperature and to provide the desired solvent to product ratio therein. The tars, which are high boiling remain in the still and are removed from time to time.

The following examples will serve to further illustrate the invention:

Two 3 liter 3 neck flasks are connected by an adiabatic vapor transfer line. One of the flasks was provided with an external heating mantle and was used as the still. The other was uninsulated and exposed to the atmosphere and served as a condenser receiver. The still was provided with a thermometer immersed to the bottom of the liquid and with a dripping funnel for the introduction of solvent or mother liquor. The condenser-receiver outlet was provided with a dephlegmator condenser which served to connect the system to vacuum. The adiabatic vapor transfer line between the two flasks consisted of tubing externally electrically traced and insulated to prevent heat loss and provided with a thermometer in order to determine that the vapors being transferred were being maintained at about the temperature of the still.

Referring to the schematic flowsheet, stage I, the crude solids to be distilled were contacted in distillation zone A with sufficient Aroclor added to dissolve the solids at a temperature below the temperature of operation of the zone. The system was then brought to the desired vacuum and the distillation zone A (still) and the transfer line to the condensation zone brought up to operating temperature. When the temperature in the distillation zone A started to climb above the desired temperature, Aroclor or mother liquor from a previous run was dripped into the distillation zone A to maintain the temperature therein. When the bulk of the material had been distilled from distillation zone A to the condensation zone the distillation was interrupted. The condensate was cooled to room temperature and filtered. The mother liquor from the filtration was returned to distillation zone A for reuse in a succeeding distillation. The solids were washed free of mother liquor with heptane and dried. The wash liquor was distilled in distillation zone B to recover heptane and mother liquor.

In stage II the distillation which was interrupted after the bulk of the product had been distilled was recommended in distillation zone A until the zone contained practically nothing but tars which were discarded. The distillate from stage II contained some impurities together with some product and Aroclor recovered from the still. This distillate was returned to the still together with more crude product and mother liquor for a succeeding distillation or simply redistilled alone if the run were the end of a series.

Example I 405 g. of crude anthraquinone (M.P. range 272–282° C.) were placed in the above described still together with 700 cc. (976 g.) of Aroclor 1242 (distillation range 325–360° C.). The system was brought to 90 mm. Hg pressure and the still was heated. When the still and transfer line reached about 257° C. material started to distill over and the temperature slowly rose to 275° to 280° C., at which temperature more Aroclor 1242 was dripped into the still to hold the temperature between 275° and 280° C. After 300 cc. (416 g.) additional Aroclor had been dripped in distillation was discontinued. The tarry material remaining in the still weighed 13 g. The distillate was cooled to room temperature and the resulting slurry was filtered. The solids were washed with heptane and dried. The weight of the dried solids was 392 g. and the melting point was 285–286° C.

Using the above procedure, a wide variety of high melting, high boiling aromatic acids, acid anhydrides, acid esters and aromatic quinones have been purified by distillation. A partial list follows.

| Example | Compound | Aroclor solvent No. | Temp. range of distillation | Press. of distill. in mm. of Hg | M.P. of product | M.P. in literature |
| --- | --- | --- | --- | --- | --- | --- |
| 2 | 2,3 naphthalic anhydride | 1232 | 275–280 | 100 | 245–246 | 246 |
| 3 | 2,6 naphthalene dicarboxy dimethyl ester | 1232 | 265–270 | 100 | 189–190 | 191 |
| 4 | Acenaphthene quinone | 1242 | 255–260 | 50 | 252–254 | 259–262 |
| 5 | 1,8 naphthalic anhydride | 1232 | 290–295 | 100 | 271–274 | 273–274 |
| 6 | B naphthoic acid | 1232 | 265–270 | 100 | 182–183 | 184 |
| 7 | Phenanthrenequinone | 1242 | 245–250 | 50 | 204–206 | 206–207 |
| 8 | Anthraquinone | 1242 | 275–280 | 90 | 285 | 286 |
| 9 | Phthalic anhydride | 1232 | 300–320 | 760 | 129–130 | 130.8 |
| 10 | Dimethyl terephthalate | 1232 | 250–260 | 80 | 140–141 | 141 |

Example II

Crude terephthalic acid was treated in a manner similar to that described in Example I except that 1500 cc. of Aroclor 1242 were charged in the flask with 300 grams of crude terephthalic. The solution at this point appeared muddy. Distillation was conducted at atmospheric pressure and temperatures ranged from 320° to 345° C. The resultant purified product had a neutralization equivalent of 83, which agrees exactly with theoretical for terephthalic acid. No melting point determination is possible since the compound does not melt. The results of this run were generally not as good as the others but were satisfactory. The ratio of Aroclor to product in the condensed vapors was from 20–25 cc. to 1 gram.

The remaining examples showed about 2 to 5 cc. of Aroclor (or mother liquor) per gram of product distilled. The amounts of tarry materials in the crudes varied but separation was always possible.

It will be appreciated that the amount of product in the overhead vapor will vary depending on the concentration in the still, temperature of distillation, and pressure at which distillation is carried out. These conditions can be varied to suit the needs of the particular occasion.

In addition, it is possible to recover product and/or solvent from the residue by redistilling the residue and returning the distillate therefrom to the main still. This process can be repeated as many times as are necessary and economical.

Although only a limited number of specific embodiments have been set forth, the invention is, nevertheless, to be broadly construed and not to be limited except by the character of the claims appended hereto.

The invention claimed is:

1. A distillation process for purifying an organic compound having a melting point over 120° C. and atmospheric boiling point over 200° C. selected from the group consisting of dialkyl esters of aromatic dicarboxylic acids, quinones, aromatic dicarboxylic acid anhydrides and terephthalic acid which comprises dissolving said compound in a chlorinated diphenyl solvent having an atmospheric boiling point over 275° C., distilling the resulting solution to obtain evolved vapors comprising said compound and said solvent and a residue comprising high boiling impurities, condensing the evolved vapors to obtain condensate comprising said compound and said solvent and separating said compound in solid state from said condensate.

2. A process according to claim 1 wherein said compound is a dialkyl ester of aromatic dicarboxylic acid.

3. A distillation process for purifying a dimethyl ester of naphthalene dicarboxylic acid having a melting point over 120° C. and atomspheric boiling point over 200° C. which comprises dissolving said ester in a chlorinated diphenyl solvent having an atmospheric boiling point over 275° C., distilling the resulting solution to obtain evolved vapors comprising said ester and said solvent and a residue comprising high boiling impurities, condensing the evolved vapors to obtain condensate comprising said ester and said solvent and separating said ester in solid state from said condensate.

4. A process according to claim 3 wherein said dimethyl ester is 2,6-naphthalene dicarboxy dimethyl ester.

5. A process according to claim 1 wherein said compound is a quinone.

6. A process according to claim 1 wherein said compound is an aromatic dicarboxylic acid anhydride.

7. A process according to claim 1 wherein said compound is terephthalic acid.

8. Process according to claim 1 wherein said distilling is conducted at a temperature in the range from 275° to 400° C.

9. Process according to claim 1 wherein said distilling is conducted at a pressure in the range from 25 to 760 mm. of Hg.

10. Process according to claim 1 wherein additional solvent is introduced during said distilling in order to maintain the temperature substantially constant.

11. Process according to claim 1 wherein said dissolving is performed by heating a mixture of solid compound and solvent to a temperature high enough to dissolve said compound.

12. Process according to claim 6 wherein said compound is phthalic anhyride.

13. Process according to claim 12 wherein said dissolving is performed by cooling the gaseous product obtained in partial oxidation of aromatic hydrocarbon to produce phthalic anhydride and passing the product into said solvent to form a solution of phthalic anhydride in said solvent.

14. Process according to claim 12 wherein said dissolving is performed by cooling the gaseous product obtained in partial oxidation of aromatic hydrocarbon to produce naphthalic anhydride and passing the product into said solvent to form a solution of naphthalic anhydride in said solvent.

15. Process according to claim 1 wherein said residue contains said solvent and is subsequently distilled to recover the solvent therefrom.

References Cited

UNITED STATES PATENTS

| 2,284,124 | 5/1942 | Britton et al. | 203—60 |
| 2,833,817 | 5/1958 | Saffer | 260—475 |
| 2,894,021 | 7/1959 | Siggel | 260—475 |
| 2,945,788 | 7/1960 | Watzl et al. | 260—475 |
| 3,036,127 | 5/1962 | Chafetz | 203—67 |
| 3,042,709 | 7/1962 | Convery | 260—515 |
| 3,277,154 | 10/1966 | Vanderwerff | 260—475 |

WILBUR L. BASCOM, JR., *Primary Examiner.*

U.S. Cl. X.R.

203—48, 67, 71, 73, 91, 75, 82; 260—475, 396, 525, 546